Sept. 2, 1969  U. OPRECHT  3,465,162

AUXILIARY GAS TURBINE GENERATOR FOR AIRCRAFT

Filed Sept. 12, 1966

INVENTOR:

Ulrich Oprecht

BY: *Abraham A. Saffitz*

ATTORNEY

United States Patent Office 3,465,162
Patented Sept. 2, 1969

3,465,162
AUXILIARY GAS TURBINE GENERATOR FOR AIRCRAFT
Ulrich Oprecht, Wittenbach, St. Gall, Switzerland, assignor to Adolph Saurer Ltd., Arbon, Switzerland, a corporation of Switzerland
Filed Sept. 12, 1966, Ser. No. 578,538
Claims priority, application Switzerland, Oct. 25, 1965, 14,668/65
Int. Cl. F02c 7/02
U.S. Cl. 290—4      5 Claims

ABSTRACT OF THE DISCLOSURE

An installation for driving a generator and for starting an aircraft jet engine comprising a small auxiliary gas turbine, an A.C. or a D.C. generator, and a shaft of the aircraft engine, all axially and concentrically aligned, with a hydrodynamic coupling interconnecting the turbine and generator, and an electromagnetic clutch interconnecting the generator and the shaft of the aircraft engine. Means for filling and draining the coupling is provided. With the coupling filled and the electromagnetic clutch disengaged, the gas turbine is able to drive the generator, and upon the engagement of the clutch, the gas turbine is connected to the aircraft engine shaft for starting the engine. With the coupling drained, the driving connection between the gas turbine and the generator is rendered inoperative and, by engaging the clutch, the generator is driven by the aircraft engine. If a D.C. generator is used, it may be run as a motor to start the gas turbine.

Figure 1:
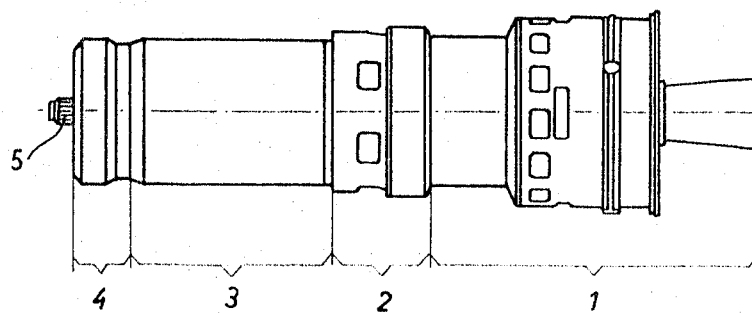

The present invention relates to an auxiliary starter for delivering an output of electrical energy which is especially adapted for aircraft jet engines, said auxiliary starter consisting of a small gas turbine which functions as the auxiliary turbine, a hydrodynamic coupling, a generator and an electromagnetic coupling, said hydrodynamic coupling taking the output from the power take-off shaft of the auxiliary turbine and supplying mechanical energy to the generator, said generator delivering an electrical output which is utilized through an electromagnetic coupling, each of the aforesaid units, e.g., turbine, hydrodynamic coupling, generator and electromagnetic coupling, acting upon a single shaft which is the power take-off shaft of the auxiliary gas turbine.

Auxiliary gas turbine starters for aircraft engines are known and there is one type which drives a generator which starts the aircraft engines through an electric starter motor fed by this generator. Still other auxiliary gas turbines are known which produce compressed air and which operate on the principle by making use of the compressed air for the starting of the aircraft jet engines.

Both prior types of auxiliary gas turbine starters have low overall efficiency, e.g., poor energy transfer efficiency, and only about 40–60% of the shaft horsepower which is available at the output of the auxiliary gas turbine is supplied to start the aircraft engine. A further disadvantage of these prior starters is that they require a generator and a starter motor for the electrical starting operation and this results in the additional weight expenditure required by the conventional generator and starter motor.

Also, gas turbines are known which act directly upon the engine shaft; but these types must be constructed in at least two stages, the first stage being in the form of a small power gas turbine which will be able to start from a dead stop position and the second stage being in the form of a free-wheeling working turbine which is coupled to the engine output shaft by means of a gear unit engaging said output shaft, said free-wheeling working turbine being acted upon by the hot gases from said first small power gas turbine. This two-stage auxiliary turbine assembly does not produce electrical energy because the auxiliary assembly is coupled directly with the aircraft engine.

An object of the present invention is to provide an auxiliary starter for delivering an output of electrical energy which is especially adapted for aircraft jet engines and which consists of a gas turbine, hydrodynamic coupling, generator and electromagnetic coupling all acting upon a single shaft which is the power take-off shaft of the auxiliary gas turbine, the hydrodynamic coupling taking the ouput from the power take-off shaft of the small auxiliary gas turbine and supplying mechanical energy to the generator which in turn delivers an electrical output. The mechanical energy output from the auxiliary turbine may also be coupled by means of an electromagnetic clutch to the aircraft jet engine power shaft to start the engine.

A further object of the present invention is to provide an auxiliary starter turbine generator for the starting of aircraft jet engines consisting essentially of a simple one-stage auxiliary gas turbine providing a constant speed independent of changes of electric load and having high energy transfer efficiency at low weight factor, e.g., low weight of the auxiliary starter. This object, according to the invention, is accomplished by a simple hydrodynamic coupling, operated in a well-known manner, which is located between the small gas power turbine and the generator on the common driven shaft and with the electromagnetic coupling being located beyond the generator on said common driven shaft.

The foregoing objects of the invention will be better understood by referring to the more detailed description which follows and by the drawing which, by way of example, shows a preferred embodiment of the invention.

Figure 2:
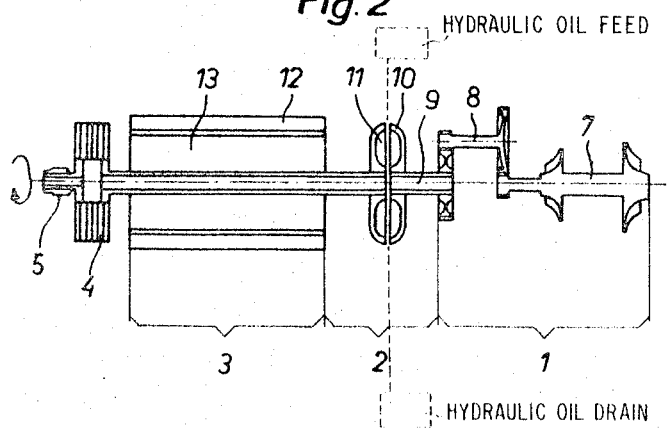

In the drawing:

FIG. 1 is a schematic view taken from the side of the preferred auxiliary starter assembly, illustrating the series of components on a common shaft in longitudinal array; and FIG. 2 is a schematic representation of the internal structure taken from the same side as in FIG. 1 and illustrating the longitudinal power train along the axis of the common shaft and furnishing a more detailed representation of the hydrodynamic and electromagnetic couplings.

In FIGS. 1 and 2, the auxiliary gas turbine 1 is shown at the extreme right and, within the housing shown in FIG. 1, the rotor 7 in FIG. 2 occupies the same general position. The rotor 7 is driven by the expanding gases in the turbine 1 and the output shaft 9 in FIG. 2, which serves as the power take-off for the auxiliary gas turbine, is driven with a clockwise rotational movement as indicated by the arrow at the extreme left of FIG. 2.

The output shaft 9 is a compound shaft and includes a first, short stub driving section which engages the reduction gear assembly 8 driven by the turbine rotor 7, as shown in FIG. 2, and a long, driven section which is coupled to the short driving section by means of the hydrodynamic coupling 2 which is of conventional structure and consisting of driving runner 10 and driven runner 11, runners 10 and 11 being in hydrodynamic coupling engagement when the coupling casing is filled with fluid to thereby provide a slip clutch torque transmitting action. A common axis extends through the rotor shaft of rotor 7, the driving stub section and the driven long section of the compound drive shaft bearing the hydrodynamic coupling 2 between the turbine 1 and the generator 3.

The generator 3, hydrodynamic coupling 2 and auxiliary gas turbine 1 are each compact, relatively short units so that the assembly provides a desirable low weight-to-volume ratio and relatively low volume of the starter assembly resulting in a significant aeronautical design advantage to render the starter mechanism useful for a wide variety of aircraft. A small auxiliary gas turbine 1, together with its hydrodynamic coupling 2, presents an overall length dimension which is comparable to the combined overall length of the electrical generator 3 and the electromagnetic coupling 4.

The rotation of the short stub driving section of the compound shaft 9 is clutch-coupled through runners 10 and 11 of the hydrodynamic coupling 2 to the longer driven section of the compound shaft with a minimum of either vertical or horizontal whip or eccentric deviation from the common axis of rotation of the driving and driven sections of the compound shaft thereby improving the energy transfer and efficiency of the starter assembly. Shaft support bearings within the generator structure itself (not shown) are used to support the long driven section of the compound shaft 9. There is minimal projection of the driven section beyond the edges of the generator at both the clutch-coupling side and the electromagnetic coupling side, thereby contributing to more efficient operation of the generator 3.

Generator 3 comprises a stator 12 and armature or rotor 13 of any desired design and wiring arrangement. It may be a D.C. dynamo or an A.C. generator, the choice depending upon the electrical characteristics desired. If it is a D.C. dynamo, it may be operated either as a motor or generator. If means 3 is a D.C. dynamo, it is initially run as a motor to start auxiliary gas turbine 7. At that time, coupling 2 is filled with fluid so that runner 11 may transmit torque to runner 10 to rotate rotor 7 of turbine 1 and thus start it. Thereafter, with electric clutch 4 open or disengaged, auxiliary gas turbine 1 rotates armature 13 of dynamo 3 through gearing 8, shaft 9 and filled coupling 2. Thus, means 3 acts as a generator and supplies electric power for any desired purpose.

If generator means 3 is an A.C. generator, it is necessary to start auxiliary gas turbine 1 with a conventional starter means (not shown). During the starting phase, it is preferable to drain or reduce the fluid within coupling 2 so that generator 3 does not load turbine 1 while starting. When turbine 1 has reached its proper speed, coupling 2 is slowly filled to rotatively couple generator 3 to turbine 1. Coupling 2 is controlled so that turbine 1 drives generator 3 at the proper speed to generate the required current at the desired voltage.

To utilize the disclosed installation as a starting means for the aircraft jet engine, auxiliary gas turbine 1 is started. Electromagnetic clutch 4 is activated to engage shaft 9 to shaft 5, shaft 5 being the aircraft jet engine shaft, or a shaft coupled thereto. As coupling 2 is filled with hydraulic fluid, it transmits rotative power from the auxiliary turbine 1 to the aircraft engine shaft 5 to rotate and start the jet engine on the aircraft.

After the aircraft engine is started and it is desired to run generator 3 from auxiliary turbine 1, coupling 2 is left filled with fluid to continue the transmission of power from turbine 1 to generator 3, and electromagnetic clutch 4 is disengaged.

If it is desired to shut down the auxiliary gas turbine 1 and to operate the generator from the aircraft jet engine, electromagnetic clutch 4 is left engaged, and coupling 2 is drained, thereby operatively disconnecting auxiliary turbine 1 from the generator.

The use of hydrodynamic coupling 2 in the power train between the auxiliary gas turbine 1 and the aircraft jet engine permits utilization of a simple, single rotor auxiliary turbine because it allows the overrunning of the auxiliary gas turbine by the aircraft engine. Therefore, the disclosed installation starts the aircraft engine without the use of a second, free wheeling stage in the starting turbine means, thus reducing the expense and complexity of prior gas turbine starting installations. Together with the above operation, the generator may be driven by the power train either from the auxiliary starting turbine or from the aircraft engine.

Having thus disclosed the invention, what is claimed is:

1. An auxiliary gas turbine generator and aircraft jet engine starter drive comprising an auxiliary single stage turbine having an output shaft, a dynamo machine having a rotor and shaft connected thereto, a hydrodynamic coupling interconnecting said output shaft and rotor shaft, an electromagnetic clutch interconnecting the rotor shaft and a shaft of the aircraft jet engine, and filling and draining means for said hydrodynamic coupling, whereby when the coupling is filled and the electromagnetic clutch is disengaged, the auxiliary gas turbine drives the dynamo as a generator, and when the electromagnetic clutch is engaged, the turbine drives the shaft connected to the aircraft engine to start the same, and draining the hydrodynamic coupling and engaging the electromagnetic clutch operatively disconnects the rotor shaft from the output shaft and connects the rotor shaft to the aircraft engine shaft to form a drive between the aircraft engine shaft and the dynamo.

2. An auxiliary gas turbine generator and aircraft jet engine starter drive as claimed in claim 1, wherein the auxiliary gas turbine, the output shaft, the hydrodynamic coupling, the rotor shaft, the electromagnetic clutch and the aircraft engine shaft are axially and concentrically aligned.

3. An auxiliary gas turbine generator and aircraft jet engine starter drive as claimed in claim 2, wherein the output shaft includes a stub shaft and gear means connecting said stub shaft to the rotor of said auxiliary gas turbine.

4. An auxiliary gas turbine generator and aircraft jet engine starter drive as claimed in claim 1, wherein said dynamo is a D.C. generator motor unit and wherein the motor phase is utilized as an electric starter for the auxiliary gas turbine with the hydrodynamic coupling filled and the electromagnetic clutch disengaged, thereby transmitting torque to the auxiliary gas turbine only.

5. An auxiliary gas turbine generator and aircraft jet engine starter drive as claimed in claim 1, wherein the dynamo is an A.C. generator.

References Cited

UNITED STATES PATENTS

| 2,599,480 | 6/1952 | Pfenninger | 60—39.14 |
| 2,669,092 | 2/1954 | Hammaren | 60—39.14 XR |
| 2,852,911 | 9/1958 | West | 60—39.14 |
| 2,908,189 | 10/1959 | Parker et al. | 60—39.14 XR |
| 3,187,188 | 6/1965 | Adkins et al. | 290—4 |
| 3,188,479 | 8/1965 | Wood et al. | 290—4 |

ORIS L. RADER, Primary Examiner

G. R. SIMMONS, Assistant Examiner

U.S. Cl. X.R.

60—39.14; 290—52